3,061,495
METHOD OF ACID TREATING HOLLOW GLASS SPHERES
Harvey E. Alford, Amherst, Ohio, assignor to The Standard Oil Company, Cleveland, Ohio, a corporation of Ohio
No Drawing. Filed June 29, 1959, Ser. No. 823,293
5 Claims. (Cl. 156—25)

This invention relates to the treatment of small, particulate, hollow, glass spheres with a solution of an acid to improve their physical and chemical properties and, in particular, relates to the treatment of such particles having a sodium borosilicate composition with an aqueous solution of a mineral acid.

Co-pending application Serial No. 862,436, filed December 2, 1959, assigned to my assignee, of which I am a co-inventor, describes a novel product consisting of a mass of small, hollow, hole-free particles prepared from discrete particles comprising a blowing agent, an alkali metal silicate expressed by the formula $(Me_2O)_x \cdot (SiO_2)_y$ wherein Me is an alkali metal and $x$ is 1 and $y$ is 0.5 to 5, and an oxide forming a glass upon fusion with the silicate. A preferable feed material is disclosed as comprising a uniform mixture of sodium silicate as a primary component containing 2.5 to 25% boric acid and 0.8 to 5.0% urea by weight based on the silicate as anhydrous silicate. A typical product, for example, has particles within the size range of 10 to 350 microns with an average diameter of 100 microns. The gas density of these particles depends primarily upon the relationship of the volume of the spheres to wall thickness. Generally, the density may be controlled within the range of 0.25 to 0.45 gram/cc., but may range from 0.1 to 0.75 gram/cc. Wall thickness of these particles is surprisingly thin and may be expressed as a percentage of the diameter of the spheres, preferably being about 0.75 to 1.5% in particles having a size of 10 to 500 microns. For example, a sphere having a diameter of 350 microns and a gas density of 0.3 gram/cc. would have a wall thickness of 4 microns, a little more than 1% of the diameter. The preferred methods for the preparation of such particles are disclosed in Patents 2,978,339 and 2,978,340, and the preferred apparatuses in co-pending applications Serial No. 859,833, filed December 2, 1959, and Serial No. 70,883, filed October 21, 1960, all of which are assigned to my assignee. The descriptions in these patents and co-pending applications are incorporated herein by reference to the extent as may be required for the clear and complete understanding of these glass particles which serve as the starting point for the present invention.

These hollow glass spheres are now commercially available and have found numerous uses in industrial applications because of their excellent dielectric properties, high temperature stability, and light weight. For example, they may be used as loose insulation fill in refrigerators and other heat- and cold-retaining applications or may be cemented together in slabs for such use. They may be used as light-weight fillers for plastics, concrete, plaster, etc. Additionally, they find special application as fillers for plastics, particularly with polyester, epoxy, polyvinyl, and silicone plastics which are subjected to high temperature applications.

It has now been found that these glass spheres may be rendered more highly desirable for various applications by contacting them with an aqueous solution of a mineral acid. Without any intent to limit the scope of the invention, it appears that such treatment is highly selective in modifying the chemical nature of the particles.

Acid contacting in accordance with the invention decreases appreciably the hygroscopic nature of the particles as originally formed. This reduction of hygroscopicity is quite important since as a consequence there is less tendency and danger of the product caking when standing in storage in a moist atmosphere and thereby losing its desired particulate nature. Acid treatment of the glass spheres has also been found to enhance thermal stability. The use of these particles as a filler for plastics in many applications is directly dependent upon the temperature stability these particles can impart, and hence any further improvement in the temperature stability of the particles themselves obviously permits new uses for the compounded plastics as well as improving these products for their present uses. The acid-treated glass particles also have improved dielectric properties and hence are more useful in various electrical applications. It has further been found that acid contacting the originally formed alkali metal silicate glass spheres effectively reduces their inherent alkaline nature. This lowering of residual alkalinity makes the acid-treated glass particles more suitable for use in various applications such as, for example, where the product is used as a filler in a resin system involving an acid-type catalyst.

In acid contacting the glass spheres in accordance with the present invention, it is not essential that the alkali metal content be completely removed or reduced to a mere nominal concentration. It has been found that the method of the invention is effective in substantially improving the glass particles when the alkali metal content is only reduced to a level which is approximately 50% of its original concentration in weight percent. Reducing the alkali metal concentration more than this amount offers certain advantages, as will be clear from test results shown hereinafter, and the actual reduction in alkali concentration below 50% of its original value will be dictated largely by the economics of operation, together with the improvement in properties desired.

Surprisingly, the hole-free character of the glass spheres is retained through the acid treatment. Microscopic inspection indicates that no etching of the glass surface occurs. Revitrification is not required subsequent to the acid contacting and the comparison of compressive, tensile, and flexural tests run on specimens containing acid-treated glass particles with specimens the same except for containing untreated glass particles indicates that the physical strength of the particles is not adversely affected by the acid treatment.

In accordance with the invention, an aqueous solution of a mineral acid is used to treat the glass spheres. Aqueous solutions of sulfuric acid, hydrochloric acid, and nitric acid are preferred, and sulfuric acid more particularly. The acid concentration of the aqueous solution should be at least 0.5 normal. Acid concentrations up to 12 normal can be used, but at acid concentrations higher than 5 normal handling and corrosion difficulties are intensified so that the preferred range will be in the range of 0.5 to 5.0 normal.

The contacting with the acid solution may be carried out at ambient temperatures and pressures, the preferred temperature being from 60 to 100° F. Higher temperatures may be used, particularly as the acid concentration is increased, but little advantage is to be gained thereby. The time of contacting will vary widely depending upon the means of agitation used to bring the solids and acid solution into contact, the weight of acid solution to the weight of particles, the acid concentration of the solution used in contacting, and to some extent the temperature of contacting. The contacting time should be no less than 15 minutes to be effective. Usually the conditions of contacting will be controlled so that the time of contacting may be held between 30 minutes to 5 hours, although contacting times longer than 5 hours may be employed if desired. Slow mechanical agitation is preferred in the process so as to keep the mass of floating particles fluid and moving but without excessive mechanical abrasion which might cause rupture of the hollow particles. The weight ratio of dry particles to the weight of acid solution is not critical in the process and may vary between wide limits. There actually is no upper limit for the amount of acid that may be used. There should be at least 3 parts acid, however, per 1 part of spheres for satisfactory contacting. For economic and handling reasons, it will be desired to avoid excessive amounts of acid and therefore a range in spheres-to-acid ratio from 0.1 to 0.2 has been found preferable.

A better understanding of the invention will be gained from the following description which is the best mode contemplated for working the invention.

The hollow glass particles used in the example were formed from a feed material consisting of a uniform mixture of sodium silicate, boric acid, and urea in the proportions of 40 parts sodium silicate having the formula $Na_2O \cdot (SiO_2)3.22$, 5.6 parts $H_3BO_3$, and 1 part urea (on a dry basis) which was prepared in accordance with the preferred embodiment of Patent 2,978,340. The feed material was converted into the hollow particles in accordance with the preferred embodiment of the method described in Patent 2,978,339. The particles had a bulk density of 0.35 gram/cc., a size range of from 10 to 350 microns, with an average diameter of 100 microns.

EXAMPLE A 40 lbs. of the above-described particles was added to a 55-gallon wooden tank containing 30 gallons of an aqueous sulfuric acid solution (a dry feed-to-acid solution weight ratio of 0.15) at a concentration of 8% $H_2SO_4$ and at ambient temperature (70° F.). The tank was adapted with a centrally disposed slow speed paddle-type agitator. The mixture was agitated for a 15-minute period which was followed by a quiescent period wherein the particles separate from the acid solution by gravity. The particles were skimmed off the top of the acid solution tank and transferred to a tank of equal volume containing 30 gallons of water for a wash cycle. The particles were agitated in the water for 1 to 2 minutes and then allowed to settle during a 5-minute quiescent period. After this period, approximately 80% of the free water volume was removed from beneath the floating particles and an equal volume of fresh wash water added from the top of the tank for a second water wash cycle. This procedure was repeated so that the particles were subjected to a total of three wash cycles. The wash water under the particles after the third wash cycle had a pH of 6. The particles were then skimmed from the top of the water wash tank and transferred to a centrifuge adapted with a muslin felt cloth, which was driven at approximately 600 r.p.m. for a 5- to 10-minute period to remove the residual water from the particles. The damp particles were then placed in a rotary drier maintained at 400° F. and dried to a moisture content of 2%. The particles were then transferred from the drier and subsequently screened to remove any lumps formed during the drying cycle.

In the foregoing treating method some of the more dense particles and particles which are broken during the contacting have a tendency to sink to the bottom of the treating tanks and are not recoverable. These losses are found to be negligible, however, and the separation by flotation in effect serves the advantage of classifying the particles so that the average density of the particles recovered from the process is lower than the density of the untreated particles. The aqueous acid solution can be used for contacting additional charges of untreated glass particles by fortifying with acid after each batch contacted. The same solution may be used in this manner to treat from 3 to 5 charges of fresh particles.

The water washing of particles should be continued following acid contacting until the residual acid is washed from the particles. Normally this may be readily controlled by measuring the pH of the water in contact with the particles after each wash cycle. Washing need not be continued after the wash water indicates a pH of 5.5.

The above procedure was repeated for the preparation of products B through E shown in Table I below wherein the acid strength, choice of acid, and time of contacting were varied. The dry feed to aqueous acid solution in weight ratio was maintained in all procedures between 0.1 and 0.15, and all procedures were carried out at ambient temperature (70° F.) and pressure. The treating conditions are shown in Table I for each of the products and may be compared with the product prepared in accordance with Example A above, and designated as product A in Table I, and untreated glass particles.

*Table I*

| Product | Conc. of Aqueous Acid Solution | Contact Time | Agitation | Percent Na |
|---|---|---|---|---|
| Untreated Particles. | | | | 16.3 |
| A | 8% $H_2SO_4$ | 30 min | 15 min | 8.4 |
| B | 7% $H_2SO_4$ | 5 hrs | Continuous | |
| C | 8% $H_2SO_4$ | 7 days | Intermittent | 3.04 |
| D | 16% $H_2SO_4$ | do | do | |
| E | 36% HCl | do | do | |

To demonstrate the improvement of the physical properties obtainable by acid treatment of the glass spheres in accordance with the invention, the following tests were conducted on the products listed in Table I. The hygroscopicity of these products was determined by exposing a sample of each in a 0.3 to 0.8 cm. layer supported over a layer of saturated salt solution in a static-controlled relative humidity chamber. The percentage increase in weight of the sample due to moisture absorption at room temperature and 76% relative humidity was recorded at intervals and the results are presented in Table II below.

*Table II*

| Product | Weight Percent Gain, 3-days Exposure | Weight Percent Gain, 7-days Exposure |
|---|---|---|
| Untreated Particles | 5.80 | 6.05 |
| A | 1.67 | 1.9 |
| B | 1.77 | 2.0 |
| C | 1.71 | 1.9 |
| D | 0.58 | 0.71 |
| E | 1.23 | 1.82 |

It will be noted from the above results that product A effectively decreases the hygroscopicity of the originally formed glass particles. It will be noted that particles treated with acid solutions for longer periods, such as products B and C, but at the same acid concentration confer no further improvement toward the lowering of hygroscopicity. Particles which had been contacted for longer periods of time at higher acid concentrations, such as product D, offer some improvement but it is doubtful that the degree of improvement can be economically justified.

The temperature stability of the various products listed in Table I were evaluated by means of a modified pyrometric cone test. In this test separate samples of each product are formed in the shape of a uniformly sized triangular pyramidal cone which is approximately 2.5 inches high with a base dimension of 0.5 inch. The cones are prepared from the free-flowing powder by dampening it with a 0.5% gum acacia solution and then forming with light pressure the damp mass in a small steel mold. This organic binder burns out at a relatively low temperature and the test therefore is a reliable indication of the inherent temperature stability of the product. The cones are placed in a muffle furnace and above 900° F. the heating rate is controlled so that the temperature increase is maintained at a rate of 150° F. per hour. The temperature at which bending of the cone occurs is observed and the fusion point, if any, of the sample is also noted. The results of this test are reported in Table III below:

*Table III*

| Product | Bending Temperature, °F. | Other Remarks |
|---|---|---|
| Untreated Particles | 1,200 | Melted at 1,400° F. |
| A | 1,650 (15° bend) | No further bending to 2,700° F. |
| B | 2,000 (15° bend) | Do. |
| C | No bending at 2,700 | Do. |
| D | do | |
| E | 1,850 (15° bend) | Do. |

It will be noted that product A exhibits a bending temperature several hundred degrees higher than that of the untreated glass particles. Although this product has a tendency to bend slightly at approximately 1650° F., no further bending occurs up to the maximum temperature of the test (2700° F.). Only product C, which was acid treated for a substantially longer period of time, and product D, which was contacted with acid of a higher concentration for a much longer period of time, show significantly superior results with respect to temperature stability.

It will therefore be seen from the foregoing that product A offers substantial improvement in physical properties over the untreated glass particles. It is quite surprising that such improvement can be obtained with acid contacting for such short periods of time and at such low acid concentrations.

To illustrate the improvements obtained in electrical properties by acid leaching hollow spheres, measurements of the dielectric constant and loss tangent by standard test procedures are reported in Table IV for various of the products described in Table I:

*Table IV*

| Product | Dielectric Constant | Loss Tangent |
|---|---|---|
| Untreated Particles | 1.31 | 0.0047 |
| A | 1.18 | 0.0028 |
| B | 1.11 | 0.0015 |

It will be noted that both the dielectric constant and tangent loss value are desirably decreased in acid-leached products A and B.

It is to be understood that various modifications of the method of the present invention will suggest themselves to those skilled in the art upon reading the foregoing description. It is intended that all such modifications be included as may be defined by the appended claims.

I claim:
1. In the art of treating hollow glass spheres having diameters within the range of 10 to 500 microns and wall thicknesses within the range of 0.75 to 1.5% of their diameters, formed from discrete particles comprising a blowing agent, an alkali metal silicate, and an oxide forming a glass upon fusion with the silicate, the method of improving the electrical properties of such hollow glass spheres without reducing their physical strength, which consists essentially of the steps of contacting said hollow glass spheres with an aqueous mineral acid bath of at least 0.5 normality for a time to reduce the alkali metal concentration of said glass spheres in weight percent by at least 50% of its original value, separating said glass spheres from said acid bath, and washing the residual acid from said particles.

2. In the art of treating hollow glass spheres having diameters within the range of 10 to 500 microns and wall thicknesses within the range of 0.75 to 1.5% of their diameters, formed from discrete particles comprised of a uniform mixture of sodium silicate having the formula $Na_2O \cdot (SiO_2)3.22$, 2.5 to 25% boric acid, and 0.8 to 5.0% urea by weight based on the silicate as anhydrous silicate, the method of improving the electrical properties of such hollow glass spheres without reducing their physical strength, which consists essentially of the steps of contacting said hollow glass spheres with an aqueous mineral acid bath of at least 0.5 normality for a time to reduce the sodium concentration of said glass spheres in weight percent by at least 50% of its original value, separating said glass spheres from said acid bath, and washing the residual acid from said particles.

3. In the art of treating hollow glass spheres having diameters within the range of 10 to 500 microns and wall thicknesses within the range of 0.75 to 1.5% of their diameters, formed from discrete particles comprised of a uniform mixture of sodium silicate having the formula $Na_2O \cdot (SiO_2)3.22$, 2.5 to 25% boric acid, and 0.8 to 5.0% urea by weight based on the silicate as anhydrous silicate, the method of improving the electrical properties of such hollow glass spheres without reducing their physical strength, which consists essentially of the steps of contacting said hollow glass spheres with an acid bath of 0.5 to 12 normal sulfuric acid for a time to reduce the sodium concentration of said glass spheres in weight percent by at least 50% of its original value, separating said glass spheres from said acid bath, and washing the residual acid from said particles.

4. In the art of treating hollow glass spheres having diameters within the range of 10 to 500 microns and wall thicknesses within the range of 0.75 to 1.5% of their diameters, formed from discrete particles comprised of a uniform mixture of sodium silicate having the formula $Na_2O \cdot (SiO_2)3.22$, 2.5 to 25% boric acid, and 0.8 to 5.0% urea by weight based on the silicate as anhydrous silicate, the method of improving the electrical properties of such hollow glass spheres without reducing their physical strength, which consists essentially of the steps of contacting said hollow glass spheres with an acid bath of 0.5 to 12 normal hydrochloric acid for a time to reduce the sodium concentration of said glass spheres in weight percent by at least 50% of its original value, separating said glass spheres from said acid bath, and washing the residual acid from said particles.

5. In the art of treating hollow glass spheres having diameters within the range of 10 to 500 microns and wall thicknesses within the range of 0.75 to 1.5% of their diameters, formed from discrete particles comprised of a uniform mixture of sodium silicate having the formula $Na_2O \cdot (SiO_2)3.22$, 2.5 to 25% boric acid, and 0.8 to 5.0% urea by weight based on the silicate as anhydrous silicate, the method of improving the electrical properties of such hollow glass spheres without reducing their physical strength, which consists essentially of the steps of contacting said hollow glass spheres with an acid bath of a 0.5 to 12 normal nitric acid for a time to reduce the sodium concentration of said glass spheres in weight percent by at least 50% of its original value, separating said glass spheres from said acid bath, and washing the residual acid from said particles.

References Cited in the file of this patent

UNITED STATES PATENTS

| 2,491,761 | Parker | Dec. 20, 1949 |
| 2,494,259 | Nordberg | Jan. 10, 1950 |
| 2,797,201 | Veatch et al. | June 25, 1957 |
| 2,834,738 | Vincent | May 13, 1958 |